(12) United States Patent
Sauvinet et al.

(10) Patent No.: US 10,556,756 B2
(45) Date of Patent: Feb. 11, 2020

(54) DEVICE FOR CONVEYING AND RETAINING GLASS SHEETS, PARTICULARLY IN A WASHING FACILITY, AND ASSOCIATED METHOD

(71) Applicant: SAINT-GOBAIN GLASS FRANCE, Courbevoie (FR)

(72) Inventors: Vincent Sauvinet, Grenoble (FR); Thierry Olivier, Thourotte (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/091,756

(22) PCT Filed: Apr. 5, 2017

(86) PCT No.: PCT/FR2017/050811
§ 371 (c)(1),
(2) Date: Oct. 5, 2018

(87) PCT Pub. No.: WO2017/174937
PCT Pub. Date: Oct. 12, 2017

(65) Prior Publication Data
US 2019/0161291 A1 May 30, 2019

(30) Foreign Application Priority Data
Apr. 6, 2016 (FR) ...................... 16 53037

(51) Int. Cl.
*B65G 49/06* (2006.01)
*B08B 11/04* (2006.01)
*B65G 17/06* (2006.01)

(52) U.S. Cl.
CPC ............ *B65G 49/064* (2013.01); *B08B 11/04* (2013.01); *B65G 17/06* (2013.01); *B65G 17/064* (2013.01)

(58) Field of Classification Search
CPC ......... B08B 11/04; B65G 17/06; B65G 49/06; B65G 17/064
(Continued)

(56) References Cited

U.S. PATENT DOCUMENTS 3,070,216 A   12/1962  Robson
3,528,259 A *  9/1970  Saal .................... C23G 3/00
                                                    134/104.3
(Continued)

FOREIGN PATENT DOCUMENTS

DE    20 2008 011687 U1   10/2008
DE    10 2007 028820 A1    1/2009
GB         2 449 309 A    11/2008

OTHER PUBLICATIONS

International Search Report as issued in International Patent Application No. PCT/FR2017/050811, dated Jul. 5, 2017.

*Primary Examiner* — James R Bidwell
(74) *Attorney, Agent, or Firm* — Pillsbury Winthrop Shaw Pittman LLP

(57) ABSTRACT

A device for conveying and holding a sheet of glass includes a conveyor and a holder configured to hold a sheet of glass in position, in particular in a horizontal position. The holder includes at least two spaced-apart and parallel lateral conveying systems, and a multitude of spaced-apart wires extending transversely with respect to the lateral conveying systems and borne thereby, the sheet of glass being intended, via at least all or part of its lateral sides, to be pressed locally against the wires, and a delivery system configured to deliver pressurized water and/or air jets, the pressurized jets being intended to be sprayed toward the upper face of the sheet of glass—the opposite face to the one supported by the wires, so as to keep the sheet of glass pressed firmly against the wires.

23 Claims, 2 Drawing Sheets

(58) Field of Classification Search
USPC .................................... 198/848, 817, 495
See application file for complete search history.

(56) References Cited

U.S. PATENT DOCUMENTS

| | | | | |
|---|---|---|---|---|
| 4,635,788 | A * | 1/1987 | McDonald | F27B 9/029 |
| | | | | 198/690.2 |
| 7,703,601 | B2 * | 4/2010 | DeLair | B65G 17/02 |
| | | | | 198/848 |
| 8,348,046 | B1 * | 1/2013 | Baumgardner | B65G 45/24 |
| | | | | 198/495 |
| 2010/0126122 | A1 * | 5/2010 | Napravnik | B65G 15/34 |
| | | | | 53/557 |

* cited by examiner

DEVICE FOR CONVEYING AND RETAINING GLASS SHEETS, PARTICULARLY IN A WASHING FACILITY, AND ASSOCIATED METHOD

CROSS-REFERENCE TO RELATED APPLICATIONS

This application is the U.S. National Stage of PCT/FR2017/050811, filed Apr. 5, 2017, which in turn claims priority to French patent application number 1653037 filed Apr. 6, 2016. The content of these applications are incorporated herein by reference in their entireties.

The invention relates to a conveying and holding device for a sheet of glass, particularly in a horizontal position, and to a washing facility for sheets of glass comprising such a device, and to the method for implementing same.

The invention will be described more particularly with reference to an application of holding, during washing and drying, a sheet of glass intended to be conveyed through the washing and drying facility, without, however, being restricted thereto. It could apply to any application requiring a sheet of glass that is to be conveyed to be held, particularly in a (substantially) horizontal position, before it is integrated into its final end-use.

The invention applies more particularly to a sheet of curved glass, particularly for automotive applications, and of very small thickness, under 1.2 mm, or even under 1.1 mm, such as 0.7 mm, or 0.55 mm, or even 0.4 mm or 0.3 mm, without, however, being restricted thereto. It may apply to any sheet of planar or non-planar glass, and to other types of vehicle or even other applications.

These days, reducing the weight of motor vehicles is one of the avenues being explored by motor manufacturers in order in particular to reduce the consumption of fossil fuel of vehicles and therefore to reduce the emissions of greenhouse gases ($CO_2$).

Of all the constituent elements of a vehicle, the glazing is one of the components where weight reductions are being sought. One of the steps in reducing the weight of glazing is to reduce the thickness of the glass. Hence, glazings, in particular windshields are now being proposed in which the interior sheet of glass has a thickness of less than 1.2 mm, such as of 1.1 mm, such as of 0.7 mm or 0.55 mm, or even 0.4 mm or 0.3 mm.

During the manufacture of laminated glazing, such as automotive glazing, the pair of curved glass sheets that are to be sandwiched together with a film of transparent plastics material has to undergo a washing operation in order to avoid the presence of dust which would otherwise carry the risk of becoming entrapped within the laminate, generating visible defects that would not be admissible given the quality imposed in the automotive field, and would lead to the glazing being scrapped.

The cleaning of the curved sheets of glass is usually performed in washing tunnels, the sheets of glass passing one behind the other along a conveying device provided with two parallel and spaced-apart belts, being laid on said belts via their edge, at four points if the sheet of glass is symmetric, or at three points if its contour is asymmetric. Washing and drying are performed over the entire surface area of the two opposite faces of the sheet of glass and on the periphery thereof, by spraying pressurized water jets followed by pressurized air jets, the fact that the sheets of glass are positioned on edge allowing the entire surface and periphery of the sheets of glass to be cleaned.

However, sheets of glass with a thickness of the order of 1.4 mm or less subjected to the pressure of the water and air jets vibrate and deform, the amplitude of the vibrations being considerably increased as the thickness of the glass decreases. Specifically, the amplitude of vibration increases as much as the bending strength of the sheet of glass decreases, in proportion with the cube of the thickness of the sheet of glass. Thus, vibrations with an amplitude of the order of 20 mm are observed under the effect of the jets of drying air for a sheet of glass of thickness 1.4 mm, and reach respectively 40 mm and even 160 mm for glass with respective thicknesses of 1.1 mm and 0.7 mm. The vibrations cause the glass to knock against the blowing nozzles and generate significant shocks on the edge face of the glass resting on the conveyor belts giving rise to rupture initiators and causing the sheets of glass to break.

Water and air pressure adjustments and nozzle alignments do not make it possible to obtain satisfactory stability or to eliminate impacts for sheets of glass of very small thickness, below 1.2 mm. There is too much breakage of the sheets of glass.

It is therefore an object of the invention to propose a device for conveying and holding a sheet of glass, which obviates the aforementioned disadvantages while allowing the sheet of glass to be held firmly while it is being conveyed and, in the target application, while it is being washed, while at the same time guaranteeing optimal washing of the surface of the two faces of the sheet of glass, including the periphery of the sheet of glass. The device of the invention may advantageously be used in existing conveying and washing facilities.

According to the invention, the device for conveying and holding a sheet of glass, comprises conveying means and holding means which are intended to hold a sheet of glass in position, in particular in a (substantially) horizontal position, and is characterized in that the holding means comprise:
  on the one hand, at least two spaced-apart and parallel conveying systems, referred to as lateral conveying systems, and a multitude of spaced-apart wires extending transversely with respect to the lateral conveying systems and borne thereby, the sheet of glass being intended, via at least all or part of its lateral sides, to be pressed locally against the wires, and
  on the other hand, means of delivering pressurized water and/or air jets, (in a plane substantially perpendicular to the plane containing the wires), the pressurized jets being intended to be sprayed toward the upper face of the sheet of glass—the opposite face to the one supported by the wires, so as to keep said sheet of glass pressed firmly against the wires.

In the remainder of the description, the terms "horizontal", "vertical", "upper", "lower", "top", "bottom", are to be understood to qualify elements of the device or of a sheet of glass when the device is resting on a horizontal plane and when the sheet of glass is associated with it also extending horizontally.

The term "height" when qualifying an element of the device is to be understood as meaning the vertical dimension, namely in a direction perpendicular to the horizontal plane containing the device.

The qualifier "lateral" is to be understood to mean a direction transverse (perpendicular) to the longitudinal conveying direction, namely direction of travel of the sheets of glass.

The lateral conveying systems extend longitudinally in the conveying direction. The two lateral conveying systems are intended to be arranged in such a way as to be on either side and some distance away from the two lateral sides of the sheet of glass which are parallel to the conveying direction.

Advantageously, the means of delivering pressurized air and/or water jets correspond to air and/or water jets intended to clean the sheet of glass on the upper face thereof, whereas other jets are sprayed at the same time onto the opposite underside face, the jets sprayed onto the upper face of the sheet of glass being higher powered than the jets sprayed onto the underside face so as to ensure that the sheet of glass is pressed firmly downward and against the wires in spite of the presence of jets on the underside face. A positive pressure gradient between the jets aimed onto the upper face and the opposing jets aimed onto the underside face is greater than 10%, for example of the order of 20%.

The wires form at least one net supported and tensioned via the two lateral conveying systems in order to support the sheet of glass, whereas the pressure jets are intended to press the sheet of glass firmly against the wires, thus holding the sheet of glass in position and avoiding any movement of amplitude of the sheet of glass when subjected to the influences of vibratory movements associated with the pressures of the water and air jets while it is being washed.

The wires have sufficient tension to support the weight of the sheet of glass without the net collapsing, at the very least without it collapsing in a plane coplanar to the end of the lower washing nozzles.

Thus, the sheet of glass intended to be conveyed is held by its underside face on the net or nets, and is so locally, remaining free of any frame surrounding its periphery, which means to say without the peripheral edge of the sheet of glass being enclosed in a structure.

According to one feature, the wires extend at least in a direction perpendicular to the conveying direction, whereas the lateral conveying systems are parallel to the conveying direction.

For preference, the wires form a network of wires, crisscrossed in the manner of a net; the wires are oriented not only perpendicular to the lateral conveying systems but also parallel to the latter and comprise a multiplicity of meshes.

According to one first embodiment, the wires form a single support of parallel and spaced-apart wires, or a single net of crossed wires, the dimensions of which are greater than those of the sheet of glass, which rests on said support or net. Hereinafter, what is meant by net is a network of crossed wires or a support comprising spaced-apart and parallel wires.

For preference, the means of conveying of the device further comprise one or two conveying systems arranged centrally and referred to as conveyors, the sheet of glass being intended by its central part, to face and rest on these central conveyors.

Current washing facilities incidentally comprise only these central conveyors.

The two lateral conveying systems are therefore synchronized to the speed of conveying of the central conveyors.

Thus, the sheet of glass rests on the net and also via the net on the central conveyors.

According to a second embodiment, the wires form a pair of two separate supports of spaced-apart wires, or a pair of two separate nets, each support or net being borne along its two opposing lateral sides by a respective one of the two lateral conveying systems on the one hand, and on the other hand by the conveying means which are positioned centrally between the two lateral conveying systems.

For preference, the conveying means comprise two central conveying systems that are parallel (and of same speed), referred to as central conveyors, each being mechanically coupled, such as by a shaft and a universal group, to a respective lateral system such that the movement of the lateral conveying systems is synchronized with the central conveyors.

The two nets respectively support two lateral parts of the sheet of glass, extending from the two edges or lateral sides of the sheet of glass toward the middle. The central part of the sheet of glass has no net and rests directly on the central conveyors.

What is meant by the lateral sides of the sheet of glass is the sides parallel to the direction of travel or of conveying of the sheet of glass, and what is meant by upstream and downstream sides is the two opposite sides that are also substantially perpendicular to the lateral sides, upstream and downstream being understood with reference to the direction of travel.

Thus, the sheet of glass that is intended to be conveyed rests (because of the fact that it is curved) at its upstream and downstream sides on the two customary central conveying systems, and is also held by all or part of its lateral sides on the net or nets, the wires locally collaborating with the lateral sides of the sheet of glass.

When the sheet of glass rests on the central conveying systems and on the single net (first embodiment) or the two nets (second embodiment), the lateral conveying systems can be adjusted heightwise so as to be able to support the sheet of glass via the nets (and therefore adapt to any type of curvature) and hold it some distance from the water and/or air spraying nozzles situated in substantially horizontal lower and upper planes.

According to another feature, the device comprises several nets or pairs of nets distributed at distances along the length of the (central and lateral) conveying systems, so as to install a plurality of sheets of glass that are to be washed in a single washing facility.

The net or nets of a pair have a dimension in the conveying direction which is greater than the dimension of the lateral sides of the sheet of glass.

The spacing between the two lateral conveying systems is greater than the dimension separating the upstream and downstream sides of the sheet of glass.

The net or nets thus extend in such a way as to support the entirety of the periphery of the sheet of glass except, possibly, for the central part.

According to another feature, the spacing of the wires allows engagement with the glass exclusively in a localized manner, avoiding contact over a continuous surface of the glass and allowing optimal washing because of the limited nature of the area of contact.

In the above embodiments, the nets are connected to the lateral conveying systems, these conveying systems generally consisting of belts 2 to 5 cm wide.

In yet another embodiment of the invention, the two lateral conveyors are made up of nets as such (which therefore form conveying means that are wider than belts). The two lateral conveyors in the form of nets are adjustable at least in terms of inclination so as to be able to adapt to suit the various curvatures of the sheets of glass that are to be conveyed.

Advantageously, the spacing of the wires or the width of a net mesh is comprised between 10 mm and 200 mm, for preference, is of the order of 50 mm.

Furthermore, each wire generates local contact with the periphery of the sheet of curved glass and, more particularly, with the lateral edges thereof in the form of a point of contact. The circumscribed diameter of the point of contact is a fraction of the width of the wire, namely a fraction of the diameter of the wire. The diameter of the wire is limited so as to minimize the area of contact. The diameter of the wires is comprised between 0.5 mm and 15 mm, for preference is of the order of 2 mm.

Moreover, the wires are preferably designed to cause the water to slip off and not to be retained. Particularly, the wires, for preference, have a smooth surface (without being twisted). The material of the wires is preferably a plastics material, such as a polyamide, in particular of the nylon type.

Therefore the device of the invention for conveying and holding a sheet of glass guarantees:
- stabilized transportation for all sheets of glass whatever the geometry of the contour of said sheet;
- protection of the edge face of the sheets of glass against any contact or shocks;
- a distribution of supports over at the periphery of the sheet of glass, in particular at four points on the two central conveyors and at least at one point on each of the lateral edges of the glazing resting on the nets, forming the least possible impediment to access by the water and the air to the entirety of the surface and the periphery of the sheets of glass.

The invention also relates to a washing and drying facility comprising the conveying and holding device of the invention, particularly for cleaning sheets of glass, in particular curved sheets of glass for vehicle glazing.

The invention finally relates to a method for implementing the device of the invention in a facility comprising a washing and drying machine, the device comprising two central conveyors, characterized in that it comprises the following steps:
- the height of the lateral conveying systems is adjusted with the device in the stopped position;
- the sheet or sheets of glass are brought by automated means in over the conveying device upstream of the washing and machine holding device so as to be deposited on the central conveyors and the wires, if present, upstream of the washing machine;
- the sheet of glass is conveyed as far as the inlet to the washing machine where its lateral edges will be supported by the net or nets (therefore present at least along the length of the washing machine);
- the conveying is started up in order to convey the sheet or sheets of glass that are to be washed and dried;
- during the washing and drying steps, therefore the spraying of pressurized jets of water and then air onto the two opposing underside and upper faces of the sheet of glass, the pressure applied by the jets toward the upper face is stronger than the pressure of the lower jets so as to ensure that the sheet of glass is kept pressed firmly against the net or nets.

In a preferred manner, the method for implementing the device of the invention is as follows, there generally being two central conveyors:
- the height of the lateral conveying systems is adjusted so that the sheet of glass can be supported in a plane (a surface) substantially mid-way between the nozzles;
- the sheet of glass is brought by automated means in over the conveying and holding device so as to be deposited on the central conveyors, and the net or the pair of nets, if present, upstream of the washing machine, the sheet of glass has its upstream and downstream sides (edges) pressed firmly against said central conveyors, the concave face in the case of a curved sheet of glass facing these (downward);
- the sheet of glass thus supported is conveyed as far as the inlet to the washing machine where its lateral edges will be supported by the net or nets (present at least over the length of the washing machine);
- the sheet of glass thus supported may undergo the washing and drying steps;
- during the washing and drying steps, therefore the spraying of pressurized jets of water and then air onto the two opposing underside and upper faces of the sheet of glass, the pressure applied by the jets toward the upper face is stronger than the pressure of the lower jets so as to ensure that the sheet of glass is kept pressed firmly against the net or nets.

The present invention is now described with the aid of examples which are purely illustrative and do not in any way restrict the scope of the invention, and on the basis of the attached illustrations, in which:

FIG. 1 depicts, in a washing facility, a schematic view in cross section of the conveying and holding device of the invention according to a first embodiment, in the position of holding a sheet of glass, the view in cross section being a transverse section with respect to the longitudinal direction of conveying and situated in a vertical plane passing through the edge face of the downstream side of the sheet of glass;

FIG. 2 is a schematic plan view of the device of FIG. 1;

FIG. 3 corresponds to the view of FIG. 1, according to a second embodiment of the device of the invention;

The conveying and holding device 1 of the invention illustrated in FIGS. 1 to 4 has the purpose of holding a sheet of glass 2 in a substantially horizontal plane, of conveying it or contributing to conveying it in a direction F, and of holding it in position without any effect of amplitude or at the very least minimizing these effects of amplitude when subjected to high vibrations on its two faces, in particular by water and air pressure jets from the delivery means 5 at least in the upper part.

Figure 1:
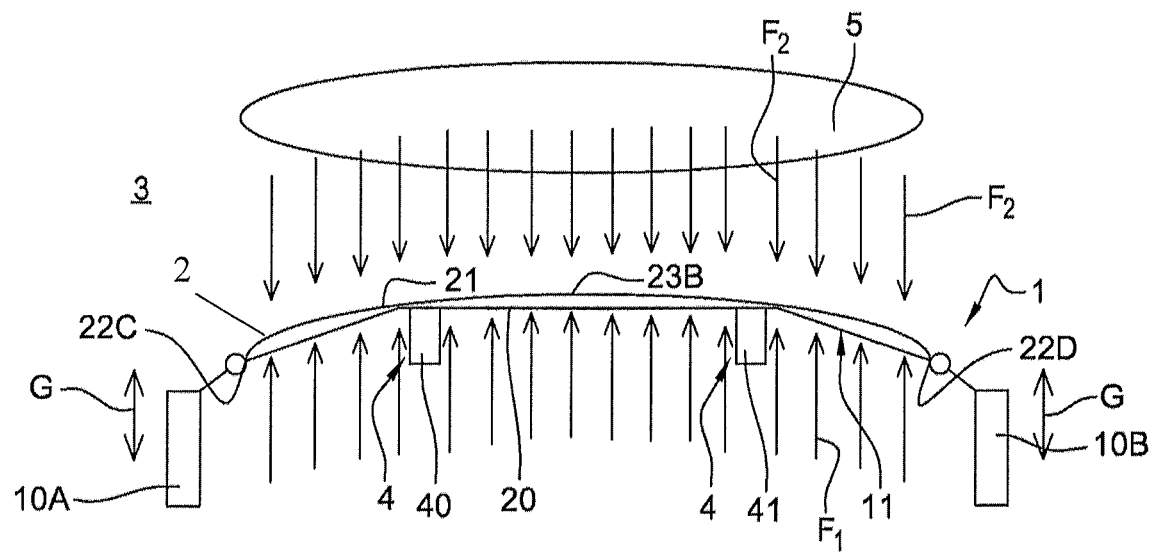

FIG. 1 is a schematic illustration in cross section of a conveying and air-spraying facility 3 comprising the conveying and holding device 1 for conveying and holding a sheet of glass 2, for preference a central conveyor system 4 comprising two parallel conveying systems 40 and 41, referred to as central conveyors, and water or air pressure jets symbolized by the arrows F1 and F2 directed vertically respectively upward and downward.

Figure 2:
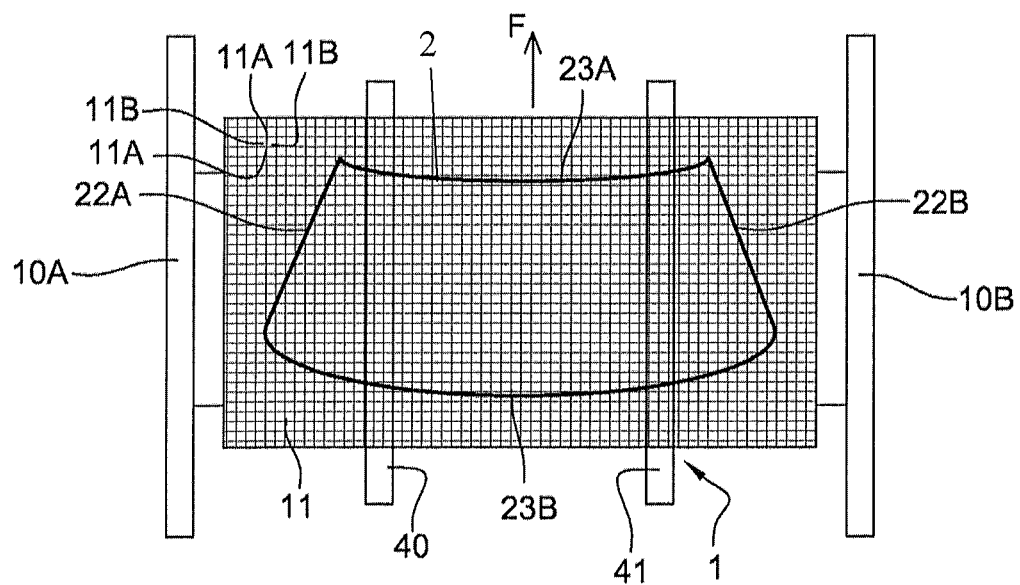
Figure 3:
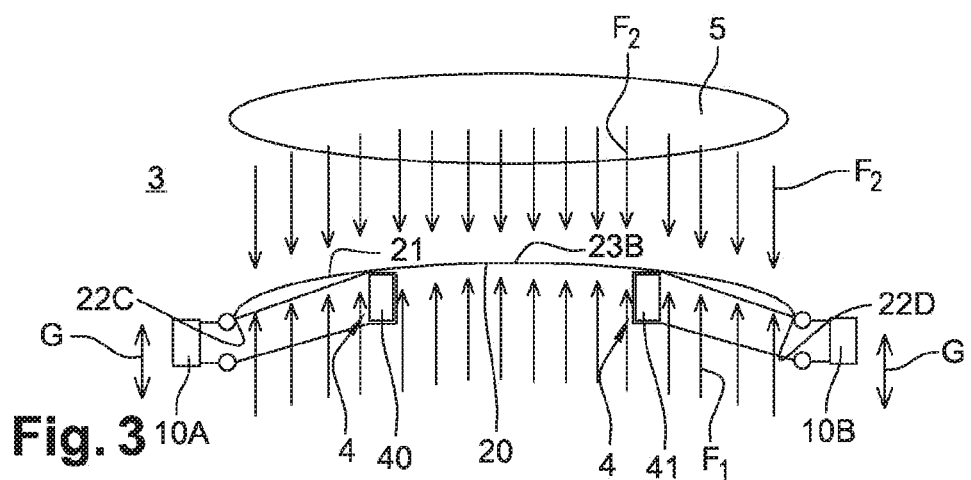
Figure 4:
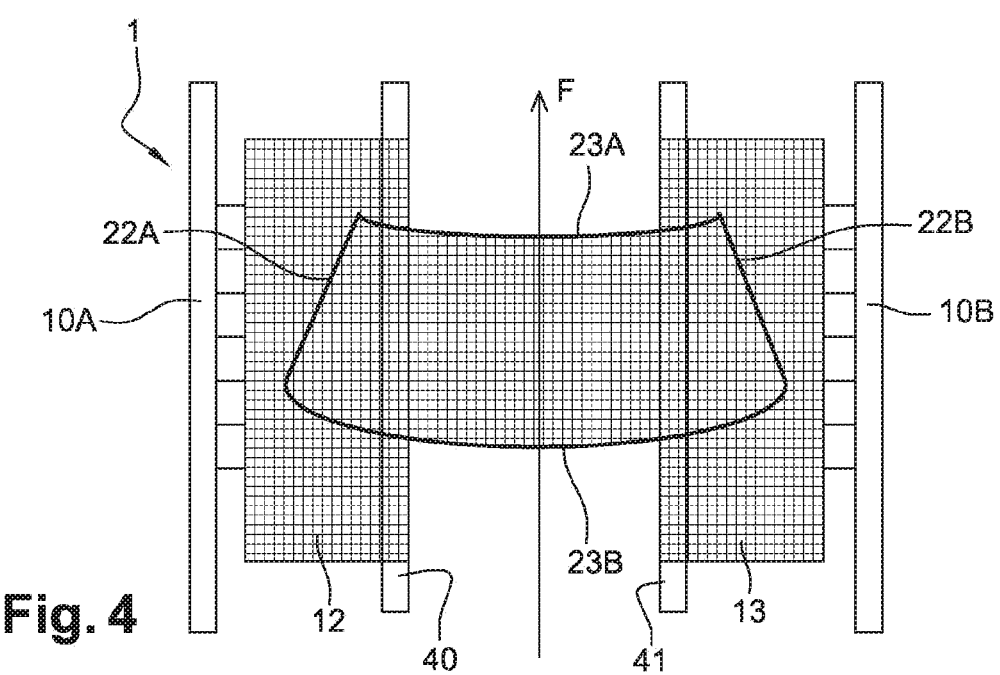
FIG. 4 is a schematic view from above of the device of FIG. 3.

The conveying and holding device 1 of the invention comprises two parallel and spaced-apart lateral conveying systems 10A and 10B, arranged laterally with respect to the sheet of glass 2 and on each side of the central conveyor system 4, and a single holding support 11 in the form of a net in the case of the embodiment of FIGS. 1 and 2, and two holding supports 12 and 13 in the form of a pair of two nets in the case of the embodiment of FIGS. 3 and 4.

The lateral conveying systems 10A and 10B move translationally in a horizontal plane, which means to say a plane perpendicular to the vertical plane of FIG. 1, to accompany the conveying of the sheet of glass.

As will be seen later on, the lateral conveying systems 10A and 10B are adjustable heightwise in the direction of the arrow G when the systems are stopped, which means to say before production starts and before the start of conveying.

The sheet of glass 2 has two opposite faces, an underside face 20 and an upper face 21, extending horizontally, the underside face 20 faces downward. The sheet of glass comprises two opposite lateral sides 22A and 22B, which are parallel to the direction of travel, and two other sides referred to as the upstream side 23A and downstream side 23B, which are transverse to the lateral sides.

The sheet of glass 2 is curved and rests horizontally on the drive belts 40 and 41 at its upstream 23A and downstream 23B sides, while the conveying and holding device 1 guarantees that the sheet of glass 2 is held in this horizontal plane perpendicular to the jets while it is being washed. Before the sheet of glass is passed through the jets, it rests on the net 11 at least via its lateral sides 22C and 22D (in the region of the lower edge of the sheet of glass) (FIG. 1).

The sheet of glass 2 in the example depicted is curved, the underside face 20 corresponding to the concave face 20. The concavity of the sheet of glass therefore faces downward, which means to say facing the central conveyor system 4.

According to the first embodiment of FIGS. 1 and 2, the net 11 is borne by the two lateral conveying systems 10A and 10B and extends from one of the lateral systems to the other. Its dimensions are greater than those of the sheet of glass 2 resting on it.

The net 11 is depicted here as forming a network of spaced-apart and parallel crossed wires 11A and 11B producing a multiplicity of square or diamond-shaped meshes. As an alternative, it could comprise only parallel and spaced-apart wires 11A arranged between the two lateral systems and running transversely to the conveying direction.

The speed of travel of each of the lateral systems 10A and 10B is synchronized to the speed of advance of the central conveyors 40 and 41, so that the net 11 supporting the sheet advances at the same speed as the central conveyors.

In the second embodiment of FIGS. 3 and 4, the wires form two separate supports of spaced-apart wires, or a pair of two separate nets 12 and 13, each with crossed wires, each net being supported along its two opposite lateral sides by a respective one of the two lateral conveying systems 10A, 10B on the one hand, and on the other hand by one of the two central conveyors 40, 41 arranged centrally between the two profiles.

Each lateral conveying system 10A, 10B is mechanically coupled, such as by belts, to a central conveyor 40, 41, so that the movement of the lateral systems 10A, 10B is synchronized with the central conveyors.

The sheet of glass 2 therefore rests in its central part on the central conveyors 40 and 41, by its lower edge and at its upstream and downstream sides 23A and 23B, and in its lateral parts respectively on the nets 12 and 13 at least via its lower lateral edges 22C and 22D.

Advantageously, the spacing of the wires or the width of a mesh of a net is comprised between 5 mm and 200 mm, for preference is of the order of 50 mm.

The diameter of the wires is limited in order to minimize the area of contact; it is comprised between 0.5 mm and 15 mm, and for preference is of the order 2 mm.

Moreover, the wires are designed to cause the water to slip off and not to be retained. Particularly, the wires have a smooth surface (without being twisted). The material of the wires is for example a polyamide such as nylon.

According to the invention, when the sheet of glass is subjected to the washing jets, the upper jets F2 apply a higher pressure than the lower jets F1, so as to compensate for the risk of oscillation of the sheet of glass 2 and to press it firmly against the net 1 or the pair of nets 12 and 13.

Each wire in contact with the sheet of glass engages with the periphery of the sheet of glass; specifically, because of the curvature of the sheet of glass and the relative flatness of the taut nets, the zones of contact of the sheet of glass 2 with the wires are limited to points of contact between the wires of the net 11 and the periphery of the sheet of glass.

The lateral conveying systems 10A and 10B associated with the net or the pair of nets are positioned by adjusting the height (vertical direction in the direction of the arrow G in FIGS. 1 and 3) of the net or nets before the start of a production run (regarding the washing of the sheets of glass) so as to support all shapes of sheets of glass (generally intended to form a windshield). In this way, there is no risk of the sheet of glass touching the nozzles that spray water and air during the washing.

The heightwise adjustment of the device and actuation thereof are preferably automated.

Figure 5:
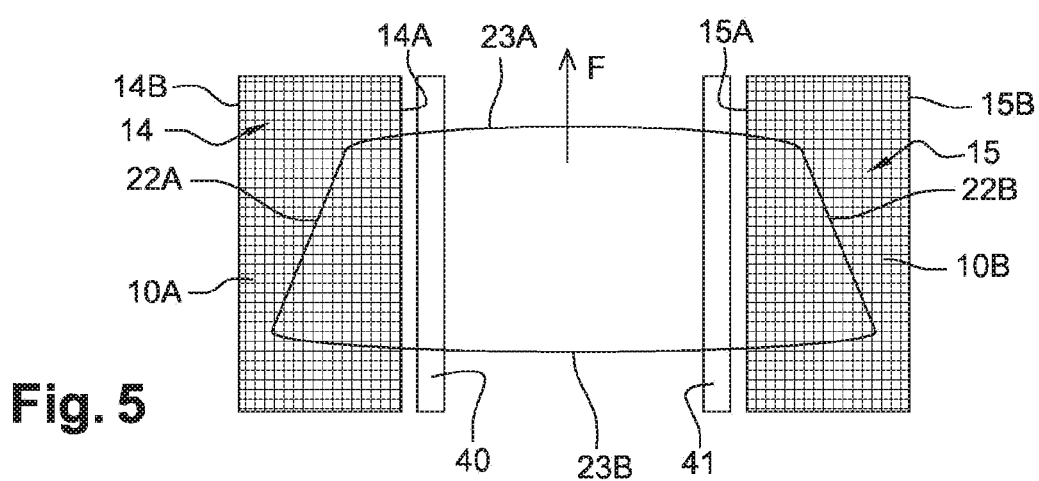
FIG. 5 is a schematic view of a third embodiment.

Finally, in another embodiment illustrated in FIG. 5, it is the lateral conveyors 10A and 10B which consist of the nets 14 and 15. The nets are adjustable for inclination so as to adapt to the various curvatures of the sheets of glass. In particular, the nets are inclined with respect to the horizontal (not visible here in the view from above) so as to be angled downward from the inner edges 14A, 15A close to the central axis of conveying toward the outside edges 14B, 15B. The sides 14A and 15A are therefore adjusted to the height of the central conveyor, if there is one, while the sides 14B and 15B are lowered by angling the net so that the lateral edges of the sheet of glass naturally come to rest on the net when its upstream and downstream sides are resting on the central conveyor, if there is one, or on the sides 14A and 15A if there no is central conveyor.

The invention claimed is:

1. A device for conveying and holding a sheet of glass comprises a conveyor and a holder configured to hold a sheet of glass in position, wherein the holder comprises:
   at least two spaced-apart and parallel lateral conveying systems and a multitude of spaced-apart wires extending transversely with respect to the lateral conveying systems and borne thereby, the sheet of glass being intended, via at least all or part of its lateral sides, to be pressed locally against the wires, and
   a delivery system configured to deliver pressurized water and/or air jets, the pressurized jets being intended to be sprayed toward an upper face of the sheet of glass, which is the opposite face to the one supported by the wires, so as to keep said sheet of glass pressed firmly against the wires.

2. The device as claimed in claim 1, wherein the lateral conveying systems extend longitudinally in a conveying direction, the two lateral conveying systems being intended to be arranged in such a way as to be on either side and some distance away from the two lateral sides of the sheet of glass.

3. The device as claimed in claim 1, wherein the delivery system configured to deliver pressurized air and/or water jets correspond to air and/or water jets intended to clean the sheet of glass on the upper face thereof, whereas other jets are sprayed at the same time onto the opposite underside face, the jets sprayed onto the upper face of the sheet of glass being higher powered than the jets sprayed onto the underside face.

4. The device as claimed in claim 1, wherein the wires extend at least in a direction perpendicular to a conveying direction, whereas the lateral conveying systems are parallel to the conveying direction.

5. The device as claimed in claim 1, wherein the wires form a network of wires, crisscrossed in the manner of a net comprising a multiplicity of meshes.

6. The device as claimed in claim 1, wherein the wires form a single support of parallel and spaced-apart wires, or a single net of crossed wires, the dimensions of which are greater than those of the sheet of glass.

7. The device as claimed in claim 1, wherein the wires form a pair of two separate supports of spaced-apart wires, or a pair of two separate nets, each support or net being borne along its two opposing lateral sides by a respective one of the two lateral conveying systems, and by a central conveying system positioned centrally between the two lateral conveying systems.

8. The device as claimed in claim 7, wherein the conveying system comprises two parallel central conveying systems each being mechanically coupled to a respective lateral system such that the movement of the lateral conveying systems is synchronized with the central conveying systems.

9. The device as claimed in claim 1, further comprising several nets or pairs of nets distributed at distances along a length of the lateral conveying systems.

10. The device as claimed in claim 1, wherein the two lateral conveyors are made up of nets.

11. The device as claimed in claim 1, wherein the spacing of the wires or the width of a net mesh is comprised between 10 mm and 200 mm.

12. The device as claimed in claim 1, wherein the diameter of the wires is comprised between 0.5 mm and 15 mm.

13. The device as claimed in claim 1, wherein the wires have a smooth surface.

14. A washing and drying facility comprising at least one holding device as claimed in claim 1, for cleaning sheets of glass for vehicle glazing.

15. A method for implementing a device as claimed in claim 1 in a facility comprising a washing and drying machine, the device comprising two central conveyors, the method comprising:
adjusting a height of the lateral conveying systems with the device in the stopped position;
bringing the sheet of glass by an automated system in over the conveying and holding device so as to be deposited on the central conveyors and the wires, if present, upstream of the washing machine;
conveying the sheet of glass as far as an inlet to the washing machine where its lateral edges will be supported by a net;
washing and drying the sheet of glass thus supported;
during the washing and drying, spraying pressurized jets of water and then air onto the two opposing underside and upper faces of the sheet of glass, a pressure applied by the jets toward the upper face is being stronger than a pressure of the lower jets so as to ensure that the sheet of glass is kept pressed firmly against the net or nets.

16. The device as claimed in claim 1, wherein the holder is configured to hold the sheet of glass in a horizontal position.

17. The device as claimed in claim 3, wherein a positive pressure gradient greater than 10% is formed between the jets aimed onto the upper face and the opposing jets aimed onto the underside face.

18. The device as claimed in claim 6, wherein the conveyor comprises one or two central conveying systems arranged centrally between the lateral conveying systems, the sheet of glass being intended by its central part, to face and rest on the one or two central conveying systems.

19. The device as claimed in claim 10, wherein inclinations of the nets are adjustable.

20. The device as claimed in claim 13, wherein the material of the wires is a plastics material.

21. The device as claimed in claim 1, wherein the at least two spaced-apart and parallel lateral conveying systems includes first, second, and third spaced-apart and parallel lateral conveying systems.

22. The device as claimed in claim 21, wherein the third spaced-apart and parallel lateral conveying system is provided between the first and second spaced-apart and parallel lateral conveying systems at a vertical elevation that is different from a vertical elevation of the first and second spaced-apart and parallel lateral conveying systems.

23. The device as claimed in claim 21, wherein at least two of the first, second, and third spaced-apart and parallel lateral conveying systems are vertically adjustable.

* * * * *